United States Patent [19]
Seiberlich

[11] 3,783,740
[45] Jan. 8, 1974

[54] GEAR SHAPING APPARATUS WITH IMPROVED CUTTER RETRACTION ARRANGEMENT

[75] Inventor: Walter Seiberlich, Ettlingen, Germany

[73] Assignee: Maschinenfabrik Lorenz Aktiengesellschaft, Ettlingen, Germany

[22] Filed: Sept. 25, 1972

[21] Appl. No.: 291,566

[30] Foreign Application Priority Data
Sept. 25, 1971 Germany.................. P 21 47 923.2

[52] U.S. Cl. ................................................. 90/7
[51] Int. Cl............................................. B23f 23/00
[58] Field of Search ........................... 90/7, 8, 9, 10

[56] References Cited
UNITED STATES PATENTS
3,225,658  12/1965  Levanovich............................ 90/7
2,730,929  1/1956  Miller .................................... 90/7

Primary Examiner—Francis S. Husar
Attorney—Roberts B. Larson et al.

[57] ABSTRACT

A gear shaping apparatus in which a spindle with the cutting wheel thereon is movable axially from its normal operating range to a retracted position to facilitate insertion and removal of the work piece. A retracting drive is provided separate from the stroke drive which reciprocates the spindle axially for normal cutting. For retraction of the spindle, the stroke drive is first disengaged from its driving connection to the spindle, after which the retracting drive is drivingly engaged with the spindle to retract the same. The retracting drive may be a fluid operated piston and cylinder unit operably connected to the spindle or a separate motor attached to a shaft which is permanently drivingly engaged with the spindle.

15 Claims, 5 Drawing Figures

PATENTED JAN 8 1974

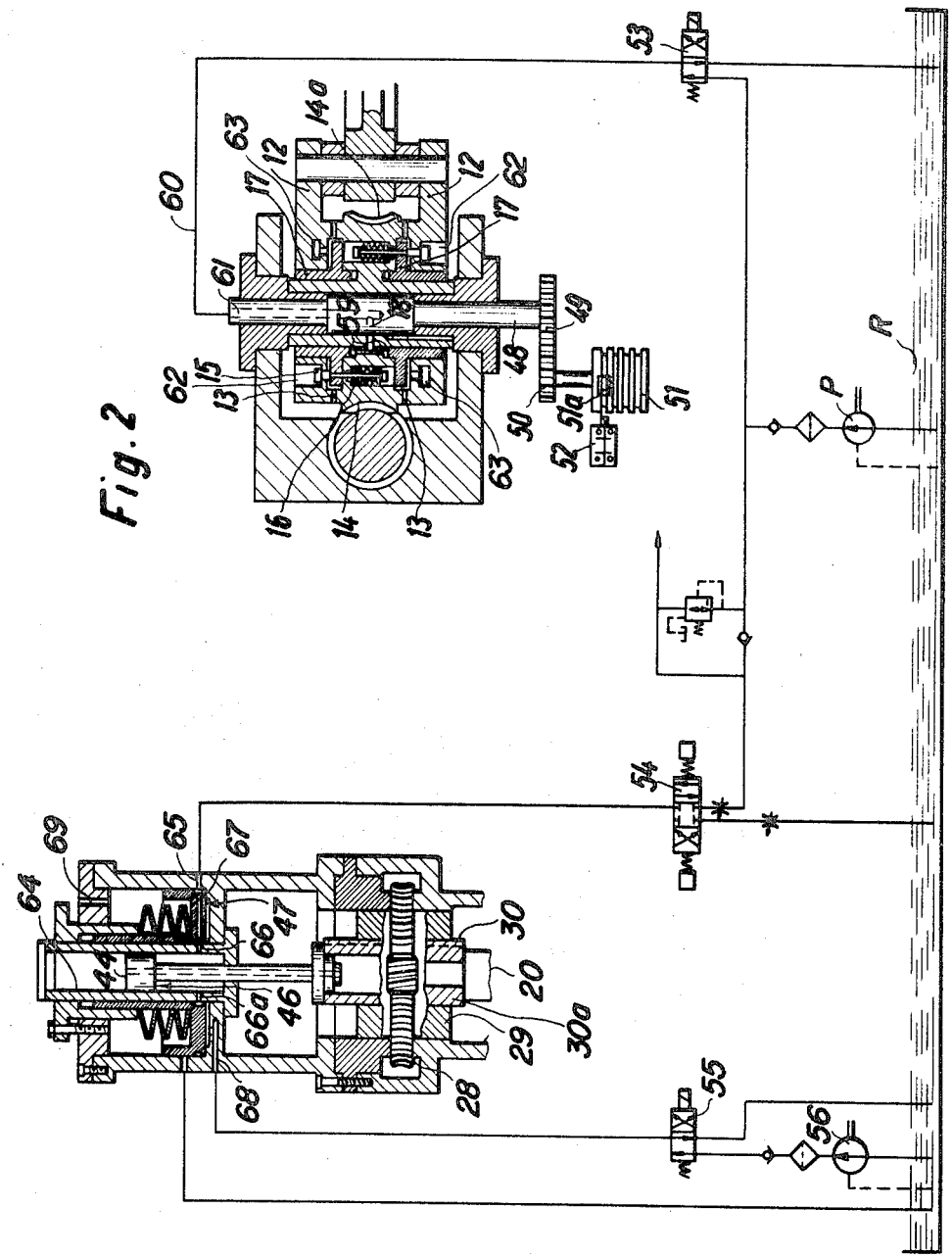

GEAR SHAPING APPARATUS WITH IMPROVED CUTTER RETRACTION ARRANGEMENT

BACKGROUND OF THE INVENTION

This invention relates to gear shaping, and in particular it relates to a new and improved gear shaping apparatus of the type in which the cutting wheel is pulled back, i.e., retracted from its normal operating range to facilitate installing and removing the work piece.

In the art of shaping or cutting a gear by the generating method, the processing of a turning work piece is accomplished by means of a revolving cutting tool which itself has the appearance of a gear. When operating according to this process, the distance between the axes of the cutting wheel and the work piece are determined when cutting outside teeth by the sum of the radii of the pitch circles, and when cutting inside teeth by the difference of the radii of the pitch circles. Either the work piece or the cutting wheel can be moved radially towards each other during the cutting operation. The work piece and the cutter wheel are connected with one another by way of gear trains at a transmission ratio related to the inverse value of the number of teeth or the radii of the pitch circles of the work piece and the cutter wheel. In known gear shapers, the rotational movement between the cutter wheel and the work piece is provided by means of gear trains having fixed transmission ratios.

For producing the gear profile on the work piece, it is necessary to move the cutter wheel axially through a double stroke, i.e., through the work piece and back, in addition to the rotational movement. As the cutting wheel moves axially through the work piece concurrent with the rotational movement of the cutting wheel and the work piece, the raw material is cut out of the work piece. For the return stroke following each operating stroke, the cutter wheel and the work piece are separated by moving the cutter wheel away from the work piece or vice versa so that the cutter wheel can return to its starting position without contacting the work piece. This lifting movement of the cutter wheel relative to the work piece takes place, depending on the type and shape of the tooth that is being produced, either in the direction of the line connecting the centers of the cutter wheel and the work piece or at an angle to this line and this movement is imparted by a corresponding control of the cutter wheel spindle or of the work piece. A means for controlling this movement is shown for example in the Ditchler U.S. Pat. No. 3,587,384 issued June 28, 1971.

The length of the operating and return strokes can be adjusted, depending on the width of the teeth being cut through the work piece. When inside teeth are being cut, which teeth are located far beneath the upper edge of the hollow body in which the teeth are located, the mounting and dismounting of the work piece can cause difficulties, particularly in the case of large work pieces. To avoid this problem, it is necessary to retract the cutter wheel completely out of this hollow body.

A gear shaping apparatus of the above described type is shown and described in U.S. Pat. No. 3,225,658. In this case, the pivoting point of a driving arm which moves the cutter wheel spindle up and down is mounted in a yoke, which, whenever the spindle stroking mechanism is stopped in its lower dead center position, is moved hydraulically upwards and, as a result thereof, also moves the spindle of the cutter wheel upward to a retracted position, whereby the cutter wheel can be moved above the upper edge of a large hollow work piece for mounting and dismounting the same. However, such known constructions have the disadvantage that the retracting movement can be made only with difficulty and that the machine is not well suited for high loads because of the movable yoke lying in the gear train of the operating stroke drive and also because of the relatively large number of movable parts required in the overall drive arrangement for providing both normal operating stroke axial movement and retraction movement. This disadvantage becomes particularly noticable when the machine does not cut by pushing from the top but by pulling through the work piece from the bottom.

Furthermore, arrangements have been known by which the chucking fixture used for connecting the work piece to the work table is capable of moving downwardly, for example by a hydraulic mechanism. However, this arrangement can be used only in the case of relatively small work pieces. In the case of large work pieces, the chucking arrangement becomes so large that it can no longer be retracted to clear the cutter wheel spindle from the work piece for laterally removing the work piece from the work table.

Thus, there exists a need in gear shaping apparatus of the type described for an improved arrangement for retracting the cutter wheel relative to the work piece.

SUMMARY OF THE INVENTION

Thus, it is a purpose of this invention to provide a gear shaping apparatus of the type described in which the previously mentioned disadvantages of known apparatus will be avoided.

This purpose of the present invention is achieved by providing an arrangement wherein after the cutting procedure is completed, the drive means which drives the spindle through its normal operating range during the cutting procedure can be disengaged from the spindle, at which time an additional drive means becomes operable to move the spindle to the retracted position. In the case of the customary design of the gear shaping apparatus which includes as a stroke drive a stroking gear connected via a cam means and a connecting rod to a rocking arm which is in turn connected to a lifting wheel which actually engages the spindle, the present invention may take the form of an arrangement which drivingly disengages the rocker arm or rocker arms from the lifting wheel whereupon the said additional drive becomes effective to lift the spindle and the cutting wheel to the retracted position, clearing the work piece.

With the spindle thus disengaged from the normal operating stroke drive, any suitable means may be utilized for retracting the spindle with its cutting wheel thereon. For example, in one arrangement, the additional drive may comprise a lifting piston and cylinder unit, the piston of which is firmly connected to the spindle of the cutter wheel, which cylinder preferably and at the same time also constitutes part of a known hydraulic weight compensating and shock absorbing system on the spindle as shown for example in the German Democratic Republic Pat. No. 52,043. Only a slight modification of this structure would be required to adapt the same for use as the additional drive of the present invention. In another embodiment, this additional drive for retracting the spindle could take the form of a separate motor releasably drivingly engaged with the shaft of the lifting wheel which remains engaged with the spindle even after it has been separated from the rocker arm or arms.

Suitable control means may be provided for automatically disengaging the stroke drive from the spindle and operating the additional drive upon completion of the gear cutting operation.

Thus, it is an object of this invention to provide a new and improved arrangement in a gear shaping apparatus for separating the cutter wheel from the work piece for mounting and dismounting of the latter.

It is another object of this invention to provide in a gear shaping apparatus of the type having a cutter wheel mounted on a spindle which moves axially during a normal cutting stroke, a means for retracting the spindle for mounting and dismounting of the work piece by disengaging the usual spindle stroke drive and utilizing a separate additional drive for retracting the spindle.

It is another object of this invention to provide, in a gear shaping apparatus of the type described which includes the customary stroke drive of a stroking gear, a cam, a connecting rod and rocker arms drivingly engaged with the spindle via a lifting wheel, a means for disengaging this normal stroke drive by separating the lifting wheel from the rocker arms whereby the additional drive may then be operated to lift the spindle without also requiring the following movements of the conventional stroke drive.

Other objects and other advantages of the invention will become more apparent from the detailed description to follow, together with the accompanying drawings.

BRIEF DESCRIPTION OF THE DRAWINGS

There follows a detailed description of preferred embodiments of the invention which are to be read together with the accompanying drawings.

FIG. 2 is a schematic view showing on the right hand side thereof a portion which is a cross-section taken along line 2—2 of FIG. 1, on the lefthand side thereof, an enlargement of the upper part of FIG. 1, together with lines illustrating schematically the hydraulic circuit for operating the present invention.

DETAILED DESCRIPTION OF THE PREFERRED EMBODIMENT

Figures 1, 4, 5:
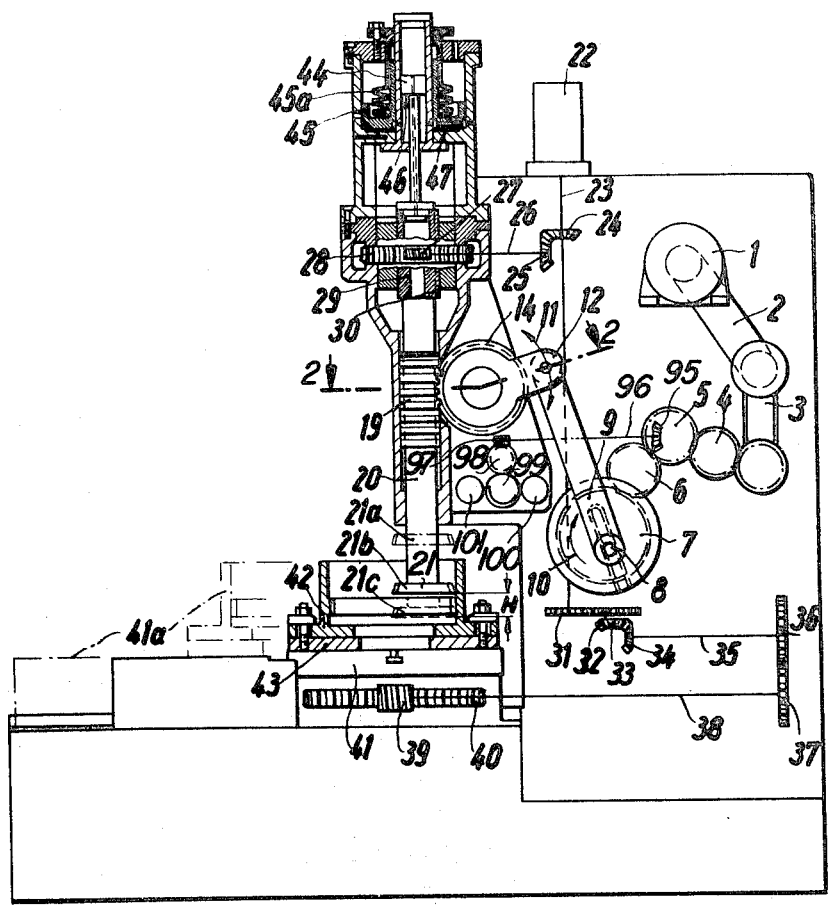
FIG. 1 is a schematic view showing the relevant parts of a gear shaping apparatus including the features of the present invention.
FIG. 4 is a circuit diagram of the control means for automatically operating the embodiment of FIGS. 1 and 2.
FIG. 5 is a circuit diagram illustrating the circuit for automatically operating the embodiment of FIG. 3.

Referring now to the drawings, like elements are represented by like numerals throughout the several views.

Referring now to FIGS. 1 and 2, the drive motor 1 of the gear shaping apparatus drives a continuous cone pulley looping gear mechanism 3 via a belt drive 2 and a stroke gear 7 via intermediate gears 4, 5, and 6. A connecting rod 9 is coupled with the stroke gear 7 by means of a pin 8, which connecting rod 9 changes the rotational movement indicated by arrow 10 to an oscillating circular movement indicated by arrow 11. A two-armed rocker arm 12 is connected with a lifting wheel 14 by a set of teeth 13 located on each side of the lifting wheel 14, each set engaging mating teeth on one of the two rocker arms 12.

The rocker arms 12 are urged into driving engagement with the lifting wheel 14 by means of springs 16 mounted on a pin 15. Two such pin and spring arrangements are shown in FIG. 2, the righthand one of which urges the lowermost rocker arm of FIG. 2 into engagement with lifting wheel 14 and the lefthand arrangement urges the uppermost rocker arm 12 of FIG. 2 into engagement with the lifting wheel 14. As shown in the drawings, the springs comprise a package, i.e., a series of Bellville springs. Between the lifting wheel 14 and each rocker arm there is provided an annular piston 17. Pressure fluid from line 60 passes through axial passage 61 and radial passage 18 to chambers 59 located interiorly of annular piston 17, i.e., between the inner surfaces thereof and the lifting wheel 14. To separate the rocker arms 12 from the lifting wheel 14, fluid is introduced through the above described lines to chamber 59 whereupon the fluid urges the pistons 17 outwardly separating the teeth 13. When the rocker arms 12 are thus separated, the lifting wheel 14 is free to rotate relative to the rocker arms 12. During such relative rotation, the pistons 17 rotate with the lifting wheel 14. The outer heads on pins 15 are free to rotate within the respective rocker arms 12 into which they extend because the recess 62 into which the pins 15 are inserted extend circumferentially, or at least a T-shaped cross-section portion 63 extends circumferentially around the axis of rocker arm 12.

The spindle 20 on which the cutter wheel is attached has a sleeve 19 attached thereon with annular teeth extending thereabout. The teeth 14a located about the circumference of lifting wheel 14 engage these annular teeth on sleeve 19 such that oscillating motion 11 of the rocker arm 12 and the lifting wheel 14 will cause reciprocating vertical movement of the spindle 20.

The cutter wheel 21 is shown attached to the lower end of spindle 20. FIG. 1 also shows three positions including an upper retracted position 21a, and lower normal operating end positions 21b (shown in solid lines) and 21c. The normal operating range which is the distance between positions 21b and 21c is represented by the distance H in FIG. 1.

The turning movement of the cutter wheel and of the work piece is accomplished by means of motor 22. The rotational movement of this motor is transferred via shaft 23 and interengaging bevel gears 24 and 25 to a shaft 26 the latter of which in turn operates a worm gear 27 which turns a worm wheel 28. Worm wheel 28 is fixed to the casing portion 29 which turns with it. An axial passage in 29 receives a spline 30 on the member 30a which is fixed to the spindle 20. Thus, turning the worm wheel 28 acts through elements 29, 30 and 30a to turn the spindle 20 while the latter is still free to move axially via spline 30a.

The rotational movement of shaft 23 also provides rotational movement of the work piece 42. For this purpose, shaft 23 is connected to a spur gear 31 engaged with spur gear 32 which transmits the rotary motion via bevel gears 33 and 34, shaft 35, speed changing gears 36 and 37, shaft 38 and worm gear 39 to the worm wheel 40 which turns the work table 41 on which the work piece 42 is mounted. A suitable chucking fixture such as 43 is provided for holding the work piece 42 onto the work table 41. Also shown in FIG. 1 is a dotted line position 41a of the work table and the work piece. At this position 41a of the work piece is fixed onto the work table, after which the latter is moved to the solid line position shown in the drawings, and to which position the work piece and the work table are moved for removal of the work piece after cutting has been completed.

A hydraulic system providing weight compensation, shock absorption and also the means for raising and lowering the spindle 20 is best shown in FIG. 2. A small piston 44 located within a fixed cylinder 64 has a lower surface 46. Surrounding this fixed cylinder 64 is an annular piston 45 urged downwardly by spring package, i.e., Bellville springs 45a, and adapted to be urged upwardly by pressure fluid introduced through passage 68 and applied against the lower surface 47 of piston 45. Piston 45 also includes a passageway 67 extending therethrough and connecting fixed openings 65 and 66 for introducing fluid into the cylinder 64 beneath piston 44. A vent opening 69 is provided above the piston 45.

While the operation of the invention will be described in greater detail below, it will be convenient to describe at this point, movement of the elements 44 and 45 when the cutter wheel 21 moves between normal operating positions 21b and 21c. At this time the spaces beneath pistons 44 and 45 are in communication with each other through openings 66 and 66a, and these areas are otherwise closed off. When the piston 44 moves downwardly, fluid moves through openings 66 and 66a and against the surface 47 beneath piston 45. Piston 45 then rises, compressing springs 45a; and as spindle 20 rises, fluid passes back through the openings 66 and 66a beneath the piston 44. Since area 47 is much greater than area 46, movement of piston 44 results in a much smaller movement of piston 45. Thus, the springs 45a can be much shorter than would otherwise be the case.

The lifting gear 14 is connected firmly rotatably with a shaft 48 on which, in addition, the two-armed rocker 12 is freely rotatably mounted. A gear 49 is attached to one end of the shaft and this engages an additional gear 50 at a ratio of 2:1, which latter gear is coupled with a cam drum 51. Trip cams 51a can be attached adjustably in grooves on the drum, and these cams operate terminal switches 52 which in turn control the flow of current to magnetically operated solenoid valves 53 and 54, the former controlling the flow of hydraulic fluid from reservoir R to chambers 59, and the latter controlling the flow of fluid from reservoir R to the space beneath piston 44. Also shown in the drawing is a solenoid valve 55 and a pump 56 for controlling the flow of fluid to and from the space beneath piston 45.

The control circuit for operating the embodiment of FIGS. 1 and 2 is shown schematically in FIG. 4. In series with the switch 52 are further switches 90 and 91 which respond to the cutter wheel reaching the predetermined depth in the work piece and the completion of a certain number of complete trips of the cutter wheel around the work piece, respectively. When all three of these switches have been closed, current can be delivered to operate the solenoids associated with valves 53, 54 and 55, the purposes for which will become more apparent in the following description of the operation of the invention.

The embodiment of FIGS. 1 and 2 operates as follows:

In the starting position the work table is at position 41a whereat the work piece is mounted thereon. The stroking gear 7 is at its lower dead center position and the cutter wheel is at its retracted position 12a. The work piece on the work table is then moved to the solid line position shown in the drawings. At this time, piston 45 is in the position shown in the drawings whereby pressurized fluid has been delivered through these openings to the space beneath piston 44 which is raised to the top of its cylinder so that cutter wheel 21 is in position 21a. At this time, fluid has also been delivered from reservoir R through valve 53 to the spaces 59 to urge the pistons 17 outwardly. At this time also valve 55 is in position to release fluid from the space beneath piston 45 to the reservoir R thus permitting piston 45 to move downwardly to the position shown in the drawings.

With the work piece now in place, piston 44 and hence spindle 20 are lowered to the position shown in the drawings by moving the valve 54 so that the fluid beneath piston 44 can pass through openings 65–67 and through the valve 54 to reservoir. Fluid is then introduced via pump 56 and valve 55 to passage 68 and this raises piston 45, placing opening 67 out of communication with openings 65 and 66. This hydraulic system is now capable of functioning as a closed weight compensating and shock absorbing system in the manner described earlier. The valve 53 is now operated to drain fluid from passage 59 so that springs 16 are operable to engage elements 12 and 14 via gear teeth 13.

The cutter wheel is now operated in the manner known per se to effect cutting. That is, the cutter wheel 21 and work piece 42 are rotated by motor 22 in the manner described above and the spindle 20 is reciprocated via elements 1–14 and 19 in the manner described above. The specific procedure for adjusting all relative machine values to provide the correct profile in work piece 42 is known per se and will not be described herein. However, some details thereof are described in the above mentioned Ditchler patent, the bove described U.S. Pat. No. 3,225,658, and in the copending commonly owned U.S. application Ser. No. 176,055, filed Aug. 30, 1971 and now U.S. Pat. No. 3,722,359.

During each operating stroke between positions 21b and 21c, the cutter wheel 21 cuts during movement in one direction and is moved clear of the work piece for movement in the opposite direction. For such clearing movement, either the work piece or the cutter wheel can be moved. In the present embodiment, the cutter wheel would be moved away from the work piece. This is accomplished by rotating the spindle 21 about a pivot axis perpendicular to the plane of FIG. 1 and passing through the center of worm gear 27. This movement is very slight, perhaps 0.5 millimeters. Hence, the teeth on sleeve 19 will not move off of the teeth on lifting wheel 14. Also, the turning movement of worm gear 27 is so slight that the tolerance in its spline connection to shaft 26 will permit the necessary movement of this gear 27 while the latter remains properly engaged with gear 28.

When the cutting of work piece 42 has been completed, the lifting wheel 14 is at the end position 21b at which time cam 51a closes switch 52. At this time, switches 90 and 91 are also closed. Valve 53 is then operated to deliver fluid from the reservoir to the chambers 59 via passages 60, 61 and 18 to disengage the lifting wheel 14 from rocker arms 12. Valve 55 is operated to connect the area beneath 45 directly with the reservoir to drain the fluid through passage 68, as a result of which 45 moves to the position shown in the drawings connecting passage 67 to passages 65 and 66. Meanwhile, valve 54 is moved to the position for delivering fluid from the reservoir through the pump P to the space beneath piston 44 to raise the latter and hence also raise and retract the spindle 20 and the cutter wheel 21. The work table 41 will now be moved laterally to the position 41a whereat the work piece 42 can easily be unclamped, removed, and a new work piece mounted thereon. The cycle then repeats itself.

Figure 3:
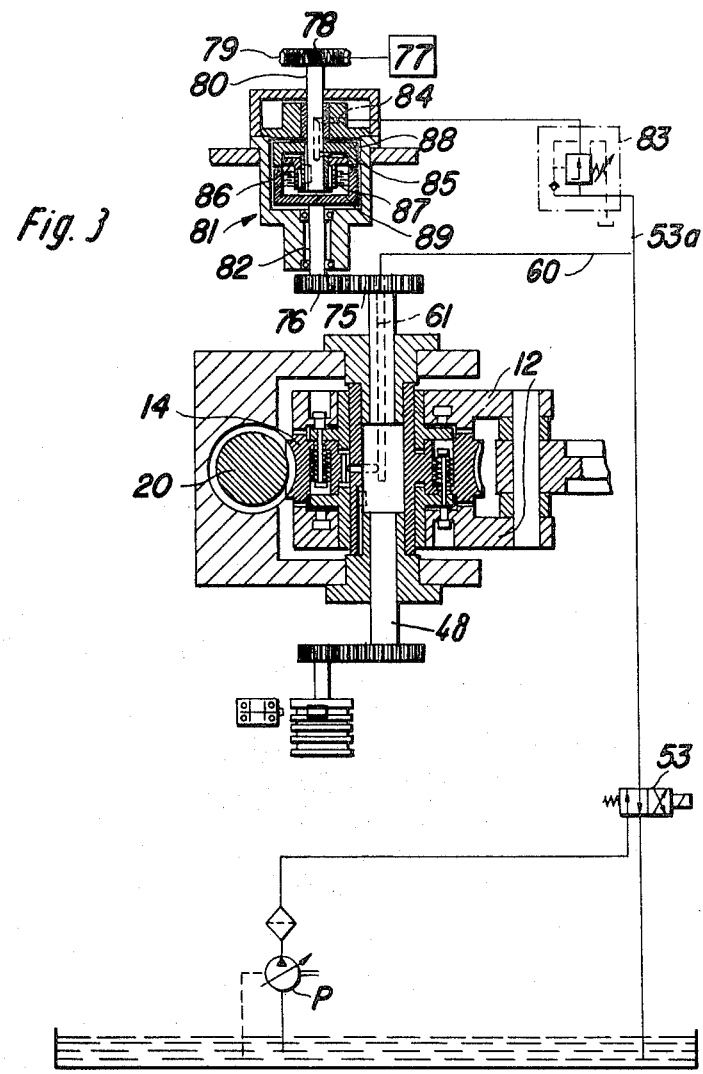
FIG. 3 illustrates another embodiment of the invention. The lower part of this figure is a cross-section taken along line 2—2 of FIG. 1, and the added features of this other embodiment are shown towards the upper portion thereof, and the hydraulic circuit for operating the embodiment of FIG. 3 is also shown therein.

FIG. 3 illustrates another embodiment of the invention. This embodiment is similar to the embodiment of FIGS. 1 and 2 except that the retracting drive, instead of being the hydraulic piston and cylinder unit shown in FIG. 2 is a separate drive which is drivingly engaged with the shaft 48.

Referring to FIG. 3, there is shown a motor 77 which drives a shaft connected to worm gear 78 which in turn drives worm wheel 79 and hence shaft 80 fixed thereto. This shaft enters a friction clutch 81, on the output side of which is a shaft 82 connected to gears 76 and 75, the latter fixed with shaft 48.

A valve 83 operates to introduce pressurized fluid to a passage 84 and a chamber 85 behind piston 86. Piston 86 is slidable along a member 88 which is rigid with shaft 80 but it is rotatable with this member 88. It includes disc plates thereon. Interleaved disc plates are attached to a further member 89 which is fixed to the output shaft 82. Fluid in chamber 85 urges piston 86 axially to move the discs of elements 86 and 89 into engagement with each other, whereby the rotating motion of shaft 80 is transmitted to the shaft 82. In other respects, the embodiment of FIG. 3 is identical to that of FIGS. 1 and 2 except of course for the face that the hydraulic piston and cylinder unit above spindle 20 would no longer need to serve the purpose of raising and lowering the spindle, and hence these elements could assume their function as known heretofore as acting as a weight compensating and shock absorbing means.

The embodiment of FIG. 3 operates in essentially the same manner as the embodiment of FIGS. 1 and 2, and hence the operation will not be explained in detail except for the differences. In this embodiment, and referring also to FIG. 5, when switches 52, 90 and 91 have been closed, current is delivered to operate the valve 53 and the motor 77. It will be recalled that switch 52 depended on the angular position of shaft 48. However, in the embodiment of FIG. 3, the retracting drive will turn 48 and hence tend to open switch 52. To prevent this, a suitable holding relay 92 can be provided. Fluid is now delivered from pump P through valve 53 to chamber 59 to disengage rocker arms 12 from lifting wheel 14. At this time, the fluid passing valve 53 passes into line 53 a and opens pressure responsive valve 83 to transmit fluid into the clutch 81 in the manner described above whereby shafts 80 and 82 are drivingly engaged, the latter turning elements 75, 76 and 48 to turn the lifting wheel to retract the spindle 20. In a preferred mode of operation, the motor 77 operates continuously. It is also possible for this motor to be normally off and to have it operated by a line parallel to the line in FIG. 5 including the solenoid of valve 53 as shown in dotted lines in FIG. 5. To start a new cycle, the spindle is lowered after which valve 53 is moved back to the position shown in FIG. 3 whereby fluid is drained from the clutch 81 and from the chambers 59, whereby the elements 12 and 14 again engage, and clutch 81 disengages.

FIG. 1 also illustrates the means referred to above for removing the cutting wheel 21 from the work piece for the return stroke between positions 21b and 21c. For this purpose, a bevel gear 95 engaged with gear 5 turns a shaft 96 which in turn rotates worm gear 97 and worm wheel 98 to rotate cam 99 which in turn rotates rollers 100 and 101 which then move the slight distance required to urge the spindle 20 slightly to the left (as viewed in FIG. 1).

Although the invention has been described in considerable detail with respect to preferred embodiments thereof, it will be apparent that the invention is capable of numerous modifications and variations without departing from the spirit and scope of the invention.

I claim:

1. A gear shaping apparatus comprising:
   a cutter wheel mounted on a spindle,
   means mounting the spindle for axial movement through a normal operating range between first and second axially spaced positions for cutting a work piece which is the gear to be shaped, and a retracted position spaced axially from the normal operating range for spacing the cutter wheel from the work piece,
   a stroke drive means for driving the spindle between said first and second positions for normal cutting operation,
   a retracting drive separate from the stroke drive for moving the spindle to the retracted position, said stroke drive being disengagable from its driving connection with the spindle,
   and means for operating the retracting drive to retract the spindle while the stroke drive is disengaged.

2. A gear shaping apparatus according to claim 1, said stroke drive including:
   a lifting wheel, the periphery of which drivingly engages the spindle for axially moving the same, a rocker arm releasably drivingly engaging the lifting wheel, and means drivingly engaged with said rocker arm for oscillating the rocker arm to in turn oscillate the lifting wheel to reciprocate the spindle axially,
   and means for disengaging the rocker arm from the lifting wheel.

3. A gear shaping apparatus according to claim 2, said rocker arm and said lifting wheel being mounted coaxially and including engaging teeth on their facing sides, said rocker arm and said lifting wheel being relatively axially movable to bring said teeth into and out of driving engagement.

4. A gear shaping apparatus according to claim 3, including a spring means urging the rocker arm and the lifting wheel into engagement with each other, and a servo-piston for separating the rocker arm and the lifting wheel teeth from engagement with each other to permit relative rotation therebetween.

5. A gear shaping apparatus according to claim 4, including a pair of rocker arms, one of each side of the lifting wheel, both the rocker arms having teeth engaging opposite sides of the lifting wheel, and including a servo-piston for each of said rocker arms.

6. A gear shaping apparatus according to claim 2, said retracting drive comprising a fluid operated piston and cylinder unit operably connected to said spindle for movement therewith, and means for operating the piston and cylinder unit to move the spindle to the retracted position when said rocker arm is disengaged.

7. A gear shaping apparatus according to claim 6, said spindle axis being vertical, and said piston and cylinder unit including a hydraulic weight compensating and shock absorbing system for compensating for the weight of the spindle and damping shocks during movement of the spindle through said normal range.

8. A gear shaping apparatus according to claim 7, including a control means for controlling operation of the piston and cylinder unit, said control means including three electrical switches in series, which switches, when closed, permit the control means to cause the piston and cylinder unit to be operated to move the spindle to the retracted position, the first of said switches closing whenever the cutter wheel reaches one of said first or second positions, which one is closest to the retracted position, the second of said switches closing after the cutter wheel has reached a predetermined depth relative to the work piece, and the third of said switches closing after completion of a certain number of complete trips of the cutter wheel around the work piece.

9. A gear shaping apparatus according to claim 8, said first switch being operated by a cam which is driven by the said lifting wheel.

10. A gear shaping apparatus according to claim 8, including spring means for urging the rocker arm and the lifting wheel into engagement with said other and a servo-piston for separating the rocker arm and the lifting wheel from each other, a solenoid fluid valve for controlling the flow of hydraulic fluid to move the spindle to the retracted position, a solenoid fluid valve for controlling the flow of oil to the said servo-piston, and said series switches, when closed, providing an electrical current path to open both of said solenoid valves.

11. A gear shaping apparatus according to claim 2, said retracting drive comprising a means for turning the lifting wheel when it is disengaged from the rocker arm.

12. A gear shaping apparatus according to claim 11, said lifting wheel fixed onto a shaft, a clutch means, one side of such clutch means drivingly engaged to said shaft, and the other side of said clutch drivingly engaged to said retracting drive.

13. A gear shaping apparatus according to claim 12, including a control means for controlling the operation of the said clutch and hence controlling the driving connection between the retracting drive and said shaft, said control means including three electrical switches in series with each other, which switches, when closed, cause the shaft to be turned by means of said retracting drive to retract the lifting wheel, the first of said switches closing whenever the cutter wheel reaches one of said first or second positions, which one is closest to the retracted position, the second of said switches closing after the cutter wheel has reached a predetermined depth relative to the work piece, and the third of said switches closing after completion of a certain number of complete trips of the cutter wheel around the work piece.

14. A gear shaping apparatus according to claim 13, said first switch being operated by a cam which is driven by the said lifting wheel.

15. A gear shaping apparatus according to claim 13, including a spring means for urging the rocker arm and the lifting wheel into engagement and including a servo-piston for separating the rocker arm and the lifting wheel from each other, a solenoid fluid valve for controlling the flow of hydraulic fluid to the said servo-piston, and a fluid valve for closing the said clutch, and said series switches, when closed, providing an electrical current to said solenoid valve to open the same, whereby hydraulic fluid flows to said servo-piston to disengage the rocker arm and the lifting wheel from each other and to said clutch to engage the same.

* * * * *